United States Patent
Govind et al.

(10) Patent No.: US 8,535,661 B2
(45) Date of Patent: Sep. 17, 2013

(54) ENZYMATICALLY ACTIVE COMPOSITIONS FOR SUPPRESSING SULFIDE GENERATION AND METHODS OF USE THEREOF

(75) Inventors: Rakesh Govind, Montgomery, OH (US); David Ferguson, Cincinnati, OH (US)

(73) Assignee: LCP Tech Holdings LLC, Cincinnati, OH (US)

( * ) Notice: Subject to any disclaimer, the term of this patent is extended or adjusted under 35 U.S.C. 154(b) by 634 days.

(21) Appl. No.: 12/657,210

(22) Filed: Jan. 15, 2010

(65) Prior Publication Data
US 2010/0239555 A1 Sep. 23, 2010

Related U.S. Application Data

(63) Continuation-in-part of application No. PCT/US2008/008815, filed on Jul. 18, 2008.

(60) Provisional application No. 60/961,078, filed on Jul. 18, 2007.

(51) Int. Cl.
*A61K 38/44* (2006.01)

(52) U.S. Cl.
USPC .................. 424/94.4; 435/189; 435/252.4

(58) Field of Classification Search
None
See application file for complete search history.

(56) References Cited

U.S. PATENT DOCUMENTS 7,285,217 B2 * 10/2007 Simpson et al. ............ 210/611

OTHER PUBLICATIONS

Greene et al., Applied and Environmental Microbiology, 2006, vol. 72, No. 12, p. 7897-7901.*
Nemati et al., Biotechnol Bioeng, 2001, vol. 74, p. 424-434.*
Gevertz et al., Applied and Environmental Microbiology, 2000, vol. 66, No. 6, p. 2491-2510.*

* cited by examiner

*Primary Examiner* — Kade Ariani
(74) *Attorney, Agent, or Firm* — Olson & Cepuritis, Ltd.

(57) ABSTRACT

The present invention provides an enzymatically active composition for suppressing sulfide generation. The composition is free from sulfur dehydrogenase and comprises at least one enzyme having sufficient sulfide-production inhibiting activity in an acidic medium to at least inhibit biogenic sulfide production, and an oxidized nitrogenous inorganic salt present in an amount sufficient to act as an electron acceptor for the enzyme. The oxidized nitrogenous inorganic salt preferably is selected from an alkali metal nitrite, an alkaline earth metal nitrite, an alkali metal nitrate, an alkaline earth metal nitrate, or a mixture of two or more of the foregoing salts. The enzymatically active composition is free from viable bacteria and is non-toxic (i.e., has an oral $LD_{50}$ in rats greater than 1000 mg/Kg of body weight at a concentration of about 25,000 parts per million (ppm) in water). The compositions of the present invention are useful for treating and removing biofilms, as well as inhibiting sulfide production in a variety of aqueous systems.

14 Claims, 4 Drawing Sheets

ENZYMATICALLY ACTIVE COMPOSITIONS FOR SUPPRESSING SULFIDE GENERATION AND METHODS OF USE THEREOF

CROSS-REFERENCE TO RELATED APPLICATIONS

This application is a continuation-in-part of PCT/US2008/008815 filed on Jul. 18, 2008 which, in turn, claims priority of U.S. Provisional Application Ser. No. 60/961,078, filed on Jul. 18, 2007.

FIELD OF THE INVENTION

This invention relates to enzymatically active compositions suitable for suppressing sulfide generation and biofilm formation in aqueous systems. More particularly, this invention relates to low toxicity compositions having sulfide oxidizing activity, and to methods of use thereof.

BACKGROUND OF THE INVENTION

Sulfate reducing bacteria (SRB), as the name implies, are a group of microorganisms that are capable of reducing sulfate ion to sulfide. Microbial sulfate reduction is a widely distributed process of great ecological importance, but with significant undesirable characteristics and effects. For example, biogenic sulfide generation can induce metal corrosion ("microbial induced corrosion" or MIC) of ferrous metals in the petroleum industry, as well as weakening and decomposition of concrete structures in water collection and treatment systems, and emission of noxious and toxic hydrogen sulfide gas, which has a characteristic "rotten egg" odor, from lagoons, ponds, water tanks, and other bodies of water.

One reason for the remarkable robustness of SRBs is their ability to form biofilms. It has been postulated that biofilms are organized communities with functional heterogeneity, and which respond to their environment like tissues of higher organisms. Current thinking on the formation of such biofilms includes the initial physical attachment of cells to the surface of a solid, which consume surface adsorbed materials. The attached cells then grow into micro-colonies through the production of cellular polysaccharide, while other cells become embedded and distributed throughout the so-formed matrix. Biofilms resemble a multicellular structure, with major resistance to biocidal activity.

The concept of intercellular signaling is one that, in spite of negligible evidence, has been discussed for several decades, especially in the context of mature biofilms. One factor contributing to the intercellular signaling hypothesis is the observation that the so-called "A-factor", which is a microbial hormone, apparently controls secondary metabolism and cellular differentiation in *Streptomyces griseus*. Another factor is the widespread production of N-acyl homoserine lactones (N-AHLs) in Gram-negative bacteria and the resultant quorum sensing. The N-AHLs are molecules that act as diffusible chemical communication signals (bacterial pheromones), which regulate diverse physiological processes, including bioluminescence, antibiotic production, and synthesis of coenzyme virulence factors.

The most widely studied signaling molecule is N-(3-oxohexanoyl)-L-homoserine lactone (OHHL) which is implicated in bioluminescence. Quorum sensing has been used to describe the various N-AHL regulatory systems, which couple high cell densities and hence substrate or nutrient starvation resulting in stationary phase gene activation. N-AHL activity has been reported in naturally occurring biofilms. Rapid recovery of biofilm populations of ammonia-oxidizing organisms after ammonia starvation was reported as a result of simultaneous ammonium and OHHL addition.

Quorum sensing plays a critical role in maintaining the biofilm structure and modifying it to varying environmental conditions. Disrupting quorum sensing with synthetic molecules may be a promising method for preventing the establishment of biofilms, which has immense industrial and medical applications. Biofilms are not only responsible for clogging of pipes, but also for chronic inflammatory conditions associated with cystic fibrosis, infection of medical devices, and catheters, spread of infection in hospitals, contaminating food packaging, etc.

Figure 1:
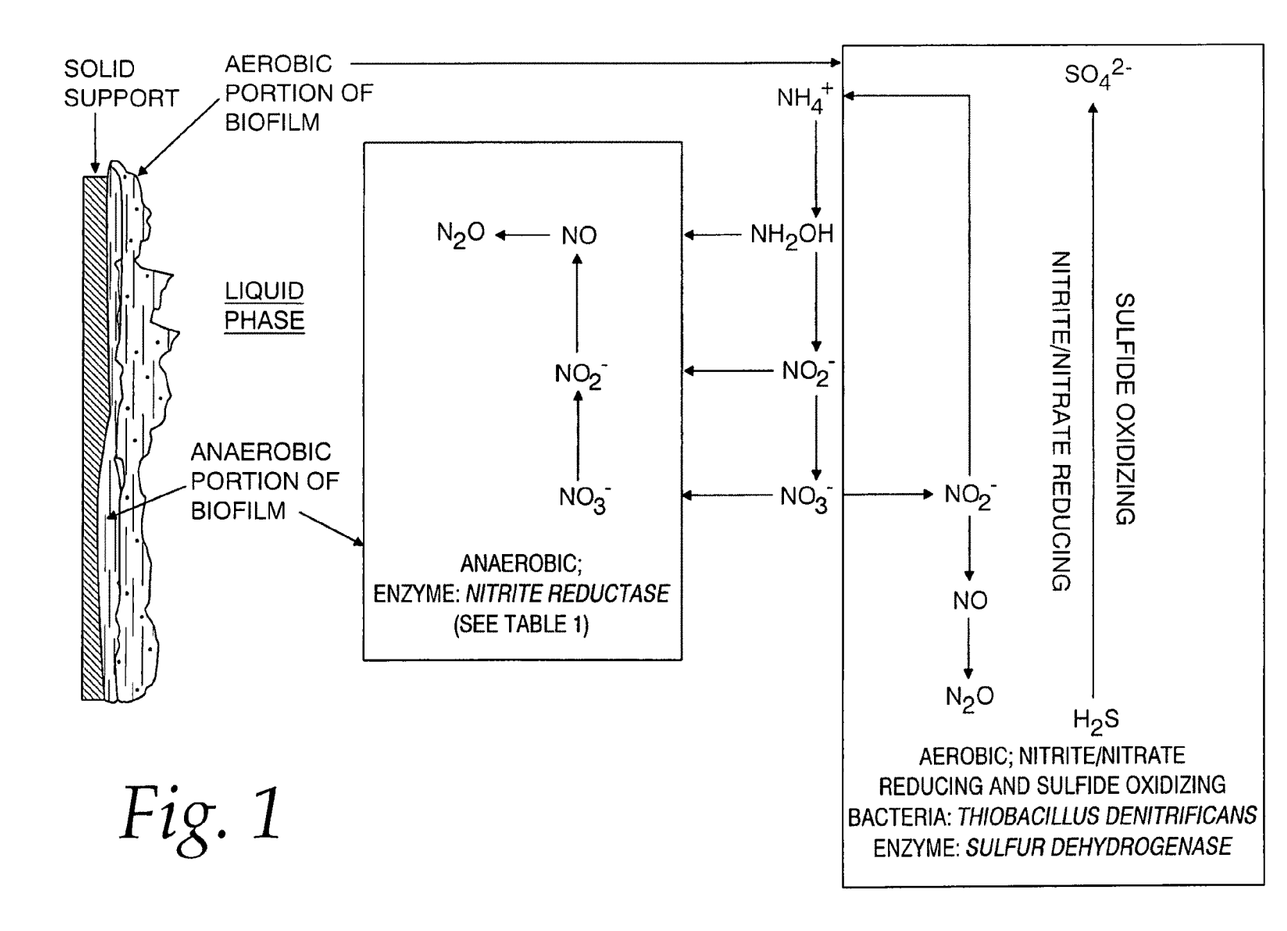
FIG. 1 is a schematic depiction of microbial nitrogen transformations under anaerobic and aerobic conditions.

Nitric oxide is another signaling molecule which is used across a range of biological systems and can be used to control biofilm development and disintegration. Denitrification and dissimilatory nitrate reduction uses $NO_3$ and $NO_2$ as electron acceptors for oxidation of organic compounds or reduced sulfur compounds, such as hydrogen sulfide. Denitrification is the respiratory reduction of nitrate ($NO_3$) and nitrite ($NO_2$) via the intermediates nitric oxide (NO) and nitrous oxide ($N_2O$). In contrast, dissimilatory nitrate reduction to ammonium (DNRA) reduce nitrate and nitrite to the final product ammonium ($NH_4^+$). FIG. 1 indicates the various forms of nitrogen compounds and their interchanges in biological systems. There are two distinct, non-overlapping conditions under which nitrite/nitrate can biologically get reduced to nitric oxide (NO). In the aerobic portion of the biofilm, which is the portion near the biomass-water interface, denitrification can be coupled with sulfide oxidation (sulfide is the electron acceptor), which is conducted by *Thiobacilus denitrificans*, using the enzyme sulfur dehydrogenase, as mentioned by Simpson and Holden (Composition for Odor Control, Simpson, G. D. and G. W. Holden, Pub. No.: US 2005/0115895 A1, Pub. Date: Jun. 2, 2005).

In the anaerobic portion of the biofilm, which is near the biofilm-solid support surface interface, denitrification is effected by nitrite reductase, as shown in Table 1, below. The electron acceptor in this case is an organic compound, present in the liquid phase, such as oil, and the like. The formation of nitric oxide in the anaerobic portion of the biofilm, which is responsible for biofilm attachment to the solid surface, can result in biofilm dispersal and subsequent removal of the entire biofilm, a mechanism that would not result in complete removal of biofilm, when occurring in the aerobic portion of the biofilm by the nitrate/nitrite reducing, sulfide oxidizing bacteria (*Thiobacillus denitrificans*).

Enzyme Technology.

Enzymes are biological catalysts that can be used to direct a chemical transformation. They are grouped into six functional classes and numerous subclasses by the Enzyme Commission of the International Union of Biochemists (*Report of the Commission on Enzymes of the International Union of Biochemistry*, Oxford: Pergamon Press: 1961; *Enzyme Nomenclature: Nomenclature Committee of the International Union of Biochemistry and Molecular Biology*, New York: Academic Press: 1992), assigning each enzyme a unique four digit number.

Enzyme technology has recently received extensive interest, especially in environmental treatment using biological systems, such as bacteria, fungi, or other microorganisms. Previous researchers have used enzymes in activated sludge systems as indicators of specific microbial populations, to measure active biomass, as indicators of chemical oxygen demand, and as indicators of phosphorus level.

In recent years interest has increased in the use of specific enzymes for treatment of aqueous systems in place of live cultures. Use of living microorganisms for treatment presents several problems, which include (1) the inability of microorganisms to survive under stringent conditions, such as high temperature, low or high pH, and the like; (2) the need for nutrients and other substrates, such as oxygen, nitrogen, phosphorus, and the like for microbial growth, thereby requiring biostimulation; (3) competition from other indigenous organisms that are better adapted to the field conditions, thereby requiring bioaugmentation; (4) generation of biomass, which has to be handled as a by-product; (5) mass transfer limitations, which require mixing due to aggregation, settling, and the like; and (6) slow degradation rates, which severely limit the practicality of microbe-based treatments.

Reduction of sulfate to sulfide requires an organic electron donor molecule, e.g., lactic acid, which is used by the SRBs, such as *Desulfovibrio* and *Desulfuromonas* species, to reduce sulfate to hydrogen sulfide and concomitantly form bicarbonate, which results in an increase in pH (Equation 1). Soluble metal salts react with the sulfide ion in-situ to produce insoluble metal sulfides (Equation 2), thereby reducing the metal (M) concentrations to acceptable levels. Bicarbonate ions react with the protons to form carbon dioxide and water, thus removing acidity from the solution as carbon dioxide gas (Equation 3).

$$3SO_4^{2-} + lactate \longrightarrow 3H_2S + 6HCO_3^- \quad (1)$$

$$H_2S + M_2^+ \longrightarrow MS(precipitate) + 2H^+ \quad (2)$$

$$HCO_3^- + H^+ \longrightarrow CO_2(gas) + H_2O \quad (3)$$

The above reactions reportedly have been used to remediate sulfate rich waters, such as acid mine drainage pits, thiosulfate in the photographic industries, sulfite in tanneries, and to treat wastewater from power plants, in which sulfur dioxide in the flue gases is removed using lime, resulting in waters containing sulfate.

Several enzymatic reactions are known to be involved in sulfate reduction. For example, adenosine 5'-phosphosulfate (APS), which is synthesized from sulfate and adenosine triphosphate (ATP) by the enzyme ATP sulphurylase (Enzyme classification 2.7.7, Table 1), serves as a nucleoside sulfate donor in sulfate reduction. APS is then broken down into sulfite and adenosine monophosphate (AMP) by APS reductase (Enzyme Classification 1.8.99, Table 1), followed by reduction to sulfide by sulfite reductase (Enzyme Classification 1.8.99, Table 1).

Inhibition of Sulfate Reduction.

Inhibition of biogenic sulfide production is typically attempted using one or more of the following approaches: (1) application of biocides; (2) use of nitrate; and (3) use of nitrite.

Biocides that reportedly have been used for inhibiting sulfide-producing bacteria include benzalkonium chloride, glutaraldehyde, formaldehyde, cocodiamine (1-($C_6$-$C_{18}$)alkyl-1,3 propane diamine acetate), nitrite salts, and molybdate salts. Their reported mechanisms of action are summarized in Table 2. As the treatment level data in Table 2 indicate, very high levels of these biocides are required to inhibit hydrogen sulfide production (e.g., 50 to 500 parts-per-thousand), making these treatments expensive and environmentally undesirable.

TABLE 2

Biocides for Inhibiting Sulfide-Producing Bacteria.

| Biocide | Chemical Nature and Mechanism of action | Minimum Concentration that prevents sulfide production |
|---|---|---|
| Benzalkonium chloride | Quarternary ammonium cationic surfactant; Solubilizes cell membranes, allowing uptake of other antimicrobials | 50 mg/L |
| Glutaraldehyde | Aldehyde; Crosslinks amino and sulfhydryl groups of proteins | 500 mg/L |
| Formaldehyde | Aldehyde; Cross links amino groups of proteins | 180 mg/L |
| Cocodiamine | Cationic surfactant at low pH; acts similarly to benzalkonium chloride | |
| Nitrite | Sulfite analog; inhibitory of sulfite reductase enzymes | 230 mg/L |
| Molybdate | Sulfate analog; depletes ATP reserves | 120 mg/L |

SUMMARY OF THE INVENTION

The present invention provides an enzymatically active composition for suppressing sulfide generation, removal of biofilms, and extending the useful life of conventional biocides in aqueous systems. The composition is free from sulfur dehydrogenase and comprises at least one enzyme having sufficient sulfide-production inhibiting activity in an acidic

TABLE 1

Listing of Enzymes Involved in Microbial Sulfate Reduction.

| No. (Reference) | Classification (Properties) | Reaction |
|---|---|---|
| 1.7.2.2 | Nitrite Reductase Donors: Nitro compounds Acceptors: cytochrome or copper | R—$NO_2$ $\longrightarrow$ R—H Aerobic<br>3NAD(P)H $\longrightarrow$ 3NAD<br>R—$NO_2$ $\longrightarrow$ R—$NH_2$ Anaerobic<br>3NAD(P)H $\longrightarrow$ 3NAD |
| 1.13.11.18 | Sulfur dioxygenase | $MS_n \longrightarrow M^{++} + S^{2-} \longrightarrow S_8 \longrightarrow SO_4^{2-}$<br>$MS_n \longrightarrow S_2O_3^- \longrightarrow SO_4^{2-}$<br>$Fe^{2+} \longrightarrow Fe^{3+}$ |
| 1.8.99 | Sulfite reductases | $SO_4^{2-} \longrightarrow SO_3^{2-}$<br>$SO_3^{2-} \longrightarrow HS^-$ |
| 1.1.1 | Oxidoreductases | R—C—OH $\longrightarrow$ R—$CO_3^-$<br>NADH $\longrightarrow$ NAD |
| 2.7.7 | Transfers phosphate to OH; Donor: ATP; Acceptor: OH | $CH_2OH \longrightarrow CH_2OP$<br>ATP $\longrightarrow$ ADP | environment to ameliorate the undesirable effects of biogenic sulfide production (e.g., odor, corrosion, and the like), and an oxidized nitrogenous inorganic salt present in an amount sufficient to act an electron acceptor for the enzyme. Preferably, the oxidized nitrogenous inorganic salt is an alkali metal nitrite, an alkaline earth metal nitrite, an alkali metal nitrate, an alkaline earth metal nitrate, or a mixture of two or more of the foregoing salts. The enzymatically active composition is active in an acidic environment, is free from viable bacteria and is non-toxic (i.e., has an oral $LD_{50}$ in rats greater than 1000 mg/Kg of body weight at a concentration of about 25,000 parts per million (ppm) in water). The composition also preferably comprises an enzyme having nitrate reducing activity, nitrite reducing activity, or a combination thereof.

Preferably, the enzymatically active composition also contains a microbial growth inhibitor (e.g., a quaternary ammonium cationic surfactant, an aldehyde, an alkali metal molybdate, an alkaline earth metal molybdate, a nitrite salt, or a mixture of two or more of the foregoing inhibitors). It is also preferred that the composition contains one or more additional enzymes that provide beneficial enzymatic activity, such as nitrite reducing activity, nitrate reducing activity, and the like.

In a preferred embodiment, the composition is prepared by growing a nitrate-reducing sulfide-oxidizing (NR—SO) bacterial culture in an acidic nutrient medium that preferably contains a sulfate salt, an oxidized nitrogenous inorganic salt (e.g., a nitrate salt) and one or more organic salts (e.g., a lactate salt, a citrate salt, and the like), preferably for about 3-5 days. A bacterial growth inhibitor (e.g., a nitrite salt) is then added to the culture in an amount sufficient to substantially arrest bacterial growth in the mixture, after which a sufficient amount of water is removed from the resulting mixture to form a solid composition. Preferably, the majority of the water is removed by reverse osmosis to concentrate the mixture, and then the obtained concentrate is further dried, e.g., in an oven, plate dryer, rotary drier, and the like.

One suitable NR—SO bacterial culture is putative *Campylobacter* sp. strain CVO, which is described in U.S. Pat. No. 5,686,293 (Jenneman et al.) and reportedly was deposited under the provisions of the Budapest Treaty on Jun. 20, 1995 at the Agricultural Research Service Culture Collection of the United State Department of Agriculture, National Center For Agricultural Utilization Research, formerly known as the Northern Regional Research Laboratory (NRRL), Peoria, Ill., and was assigned NRRL Accession No. B-21472. Preferably, the bacterial culture has a sulfide oxidizing activity similar to strain CVO. A particularly preferred bacterial strain is a mixed culture comprising *Halothiobacillus, Burkholderia, Rhizoblum, Ensifer* and *Aminobacter* species, having ATCC Accession No. PTA-8448.

In another aspect, the present invention provides a method of ameliorating biofilm formation in an aqueous system. The method comprises contacting the aqueous system with an effective concentration of an enzymatically active composition of the invention, as described above, for a period of time sufficient to inhibit the formation of a biofilm in the aqueous system and remove at least a portion of any biofilm already present in the aqueous system.

In yet another aspect, the present invention provides a method of ameliorating sulfide contamination in an aqueous system. The method comprises contacting the aqueous system with an effective concentration of an enzymatically active composition of the invention, as described above, for a period of time sufficient to inhibit the formation of sulfide in the aqueous system.

The compositions and methods of the present invention are useful for treating and removing biofilms and reducing sulfide production in a variety of gas and solid systems, as well as aqueous and semi-aqueous systems, such as cooling towers, bioreactors, food processing, beverage processing, industrial process waters, drinking water systems, pulp and paper mill systems, brewery pasteurizers, water purification systems, membrane separation systems, filtration systems, air washer systems, oil and gas drilling fields and muds, oil and gas production systems, oil and gas pipelines and petroleum recovery processes, industrial lubricants, cutting fluids, heat transfer fluids and systems, landfills and associated leachates, decorative fountains, water transport systems, lagoons, ponds and other water bodies, tanks (e.g., cleaning fluid and metal working fluid tanks), machine sumps, liquid distribution systems, solid waste handling and storage, and the like (e.g., wherever sulfide-producing bacterial may exist). In addition, the compositions of the present invention are environmentally friendly ("green") materials, which are essentially non-toxic and can be produced by environmentally acceptable fermentation/culturing processes.

DETAILED DESCRIPTION OF PREFERRED EMBODIMENTS

Enzymatically active compositions of the invention comprise at least one enzyme having sufficient sulfide-production inhibiting activity to ameliorate the effects of biogenic sulfide production, and an oxidized nitrogenous inorganic salt present in an amount sufficient to act as an electron acceptor for the enzyme. The enzymatically active composition is free from viable bacteria and has an oral $LD_{50}$ in rats greater than 1000 mg/Kg of body weight at a concentration of about 25,000 parts per million (ppm) in water. The composition can be in the form of a free-flowing powder, a tablet, a pellet, a granular solid, a paste, an aqueous solution, or any other suitable form that may be desired.

The composition includes one or more oxidized nitrogenous inorganic salts as an electron acceptor for enzymes present in the composition. Preferably, the oxidized nitrogenous inorganic salt is selected from an alkali metal nitrite, an alkaline earth metal nitrite, an alkali metal nitrate, an alkaline earth metal nitrate, and a mixture of two or more of the foregoing salts. Preferably, the oxidized nitrogenous inorganic salt is present in the enzymatically active composition in an amount in the range of about 0.1 to about 45 percent by weight. The composition also can include other salts, such as halides (e.g., sodium chloride, potassium chloride), sulfates (e.g., sodium sulfate, sodium hydrogen sulfate), carbonates (e.g., sodium carbonate, sodium bicarbonate), phosphates, and the like, as well as organic salts such as acetates, lactates, citrates, and the like, in amounts in the range of about 1 to about 30 percent by weight, based on the dry weight of the composition.

In preferred embodiments, the enzymatically active composition further comprises a microbial growth inhibitor. Non-limiting examples of suitable inhibitors include a quaternary ammonium cationic surfactant, an aldehyde, an alkali metal molybdate salt, an alkaline earth metal molybdate salt, a nitrite salt, and a mixture of two or more of the foregoing inhibitors. Non-limiting examples of preferred inhibitors include benzalkonium chloride, glutaraldehyde, formaldehyde, cocodiamine, nitrite salts (e.g., sodium nitrite), and molybdate salts (e.g., calcium molybdate). Nitrite salts are particularly preferred.

Synthesis and Manufacture of Enzyme Compositions.

Preferred enzymatically active compositions of the invention can be prepared by growing nitrate-reducing sulfide-oxidizing bacteria (NR—SOB), such as putative *Campylobacter* strain CVO, NRRL Accession No. B-21472, or the mixed culture having ATCC Accession No. PTA-8448, described herein, in an acidic aqueous nutrient medium containing a oxidized nitrogenous inorganic salt and concentrating the resulting enzymatically active solution which is free from sulfur dehydrogenase. Preferably, the culture is grown for about 3 to 5 days in a nutrient medium containing a sulfate salt (e.g., sodium sulfate), an organic nutrient (e.g., sodium lactate), and a nitrate salt (e.g., sodium nitrate) in water at a mildly acidic pH (e.g., about pH 5.5 to about pH 6.5). A bacterial growth inhibitor is then added to the culture in an amount sufficient to substantially arrest bacterial growth therein, and a sufficient amount of water is then removed to form a solid composition therefrom. In general, the water can be removed by evaporation to dryness, and/or by reverse osmosis to concentrate the mixture and subsequently drying the concentrated mixture to form a solid composition therefrom. Preferably, the drying is performed at a temperature in the range of about 55 to about 75° C.

Non-limiting examples of reverse osmosis membranes useful for concentrating the compositions of the present invention include cellulose acetate (e.g., cellulose triacetate) and silicon-based membranes. Non-limiting examples of drying systems and equipment suitable for removing water from the composition include ovens, rotary plate driers, rotary driers, and the like.

It has been reported, e.g., in U.S. Pat. No. 5,686,293 to Jenneman et al., that NR—SOB are effective inhibitors of biogenic sulfide production, e.g., by sulfate-reducing bacteria (SRB). The mechanism of inhibition of sulfide production NR—SOB and nitrate has been attributed to increasing redox potential and/or to nitrite production. Enzymatically active compositions prepared from NR—SOB according to the present invention are used to ameliorate sulfide production and inhibit biofilm formation by SRBs in aqueous systems.

Non-limiting examples of bacterial cultures for use in preparing an enzymatically active composition of the invention include putative *Campylobacter* species strain CVO, NRRL Accession No. B-21472 (see Gevertz et al. *Appl. Environ. Microbiol.* 2000; 66:2491-2501), putative *Campylobacter* species strain FWKO-B (NRRL Accession No. B-21473), *Marinobacter aquaeolei*, *Sulfurospirillum* species, *Halothiobacillus* species, *Burkholderia* species, *Rhizoblum* species, *Ensifer* species, *Aminobacter* species, and similar species of sulfide oxidizing bacteria, as well as mixed cultures comprising a combination of two or more of the foregoing. The mixed culture having ATCC Accession No. PTA-8448, described herein, is particularly preferred.

Putative *Campylobacter* strain CVO, and putative *Campylobacter* strain FWKO-B are described in U.S. Pat. No. 5,686, 293.

In another aspect, the present invention provides a method of ameliorating biofilm formation in an aqueous system, which comprises contacting the aqueous system with an effective concentration of an enzymatically active composition of the invention for a period of time sufficient to inhibit the formation of a biofilm in the aqueous system and remove at least a portion of any biofilm already present in the aqueous system. Preferably, the composition is contacted with the biofilm by applying the composition as an aqueous solution at a concentration in the range of about 5 to about 3000 ppm, more preferably about 30 to about 100 ppm. The composition is applied as needed to control the biofilm. For example, the composition can be added over time based on monitored sulfide levels in the aqueous system. Preferably, the pH of the aqueous system in which the biofilm is present is in the range of about pH 5 to pH 10.

In yet another aspect the present invention provides a method of ameliorating sulfide contamination in an aqueous system, which comprises contacting the aqueous system with an effective concentration of an enzymatically active composition of the invention for a period of time sufficient to inhibit the formation of sulfide in the aqueous system. Preferably, the composition is contacted with the sulfide-containing water by applying the composition as an aqueous solution or suspension at a concentration in the range of about 5 to about 3000 ppm, more preferably about 30 to about 100 ppm. The composition is applied as needed to control the sulfide in the aqueous system. For example, the composition can be added over time based on monitored sulfide levels in the aqueous system.

In some preferred embodiments, the composition of the invention is applied in conjunction with a biocidal composition, such as hypochlorite bleach, a quaternary ammonium cationic surfactant, an aldehyde, an alkali metal molybdate, an alkaline earth metal molybdate, a nitrite salt, or a mixture of two or more of the foregoing, to control biofilms and/or reduce sulfide concentrations. The compositions of the invention work with the biocidal composition, such as hypochlorite, in a cooperative manner, which can surprisingly extend the useful lifetime of the biocide in the aqueous system.

The present methods are suitable for inhibiting and removing biofilms and for inhibiting and reducing sulfide production in any aqueous system in which biofilm formation or sulfide contamination is a problem. Examples of such systems include, water treatment systems, wastewater treatment systems, metal working fluid tanks, oil production systems, ponds, pools, cleaning tanks, and the like.

Example 1

A mixed bacterial culture, having ATCC Accession No. PTA-8448, was grown in a modified Coleville Synthetic Brine (mCSB), containing about 12 mM sodium sulfate, about 30 mM sodium lactate and about 10 mM sodium nitrate. After the strain CVO has grown for about 4 days, the bacterial growth was terminated by adding about 100 ppm of sodium nitrite, and then passing the mixture through a cellulose acetate reverse osmosis membrane (H1312-075/K/C, Osmonics, Livermore, Calif.) to remove about 98% of the water, leaving behind a concentrated, enzymatically active mixture of culture containing inorganic salts. The so-obtained concentrated mixture was then dried in an oven maintained at about 55° C. to form a powder.

The mixed bacterial culture utilized in this Example was deposited, with the American Type Culture Collection (ATCC; Manassas, Va.) on May 23, 2007, under the provisions of the Budapest Treaty, and was assigned ATCC Accession Number PTA-8448.

ATCC Culture No. PTA-8448 was genetically characterized using denaturing gradient electrophoresis (DGGE). The bands listed in Table 3 were observed and identified based on similarity to DNA sequences in the Ribosomal Database Project (RDP). Similarity indices above about 0.9 are considered excellent matches; similarity indices in the range of 0.7 to about 0.8 are considered good, while similarity indices below about 0.6 are considered to be unique sequences. The similarity indices listed in Table 3 range from about 0.861 to 1.00, indicating a very good to excellent match to sequences of the listed genus. Bacteria must constitute about 1-2 percent or more of the total bacterial community to form a visible band. Phylogenic affiliations are presented in Table 4, along with the GenBank Accession No. of each matching sequence.

TABLE 3

Bacterial Characterization.

| Band | Similar Genus | Similarity Index | Donors | Acceptors | Description |
|---|---|---|---|---|---|
| 1.3 | Halothiobacillus | 0.954 | $S_2O_3^{-2}$ | nitrate, sulfate | shallow water aerobes |
| 1.4 | Halothiobacillus | 1.00 | $S_2O_3^{-2}$ | nitrate, sulfate | shallow water aerobes |
| 1.5 | Burkholderia | 0.861 | organics | oxygen | freshwater soil |
| 1.6 | Rhizoblum | 1.00 | complex organics | oxygen | contains the formerly valid genera Allorrhyzoblum and Agrobacterium |
| 1.6 | Ensifer | 1.00 | | | |
| 1.6 | Aminobacter | 1.00 | | | |

TABLE 4

Phylogenic Affiliations.

| Band | Similar Genus | Similarity Index | GenBank Accession No. |
|---|---|---|---|
| 1.3 | Halothiobacillus | 0.954 | AF173169; AY096035; AY487255 |
| 1.4 | Halothiobacillus | 1.00 | AF173169; AY096035; AY487255 |
| 1.5 | Burkholderia | 0.861 | AY497470 |
| 1.6 | Rhizoblum | 1.00 | X74915 |
| 1.6 | Ensifer | 1.00 | Z78204 |
| 1.6 | Aminobacter | 1.00 | AJ011760 |

A 25,000 ppm aqueous solution of the so-formed powdered enzymatically active composition was tested by an independent laboratory for acute oral toxicity, acute skin irritation, and acute eye irritation according to standard U.S. Environmental Protection Agency (EPA) Health Effects Guidelines, OPPTS 870.1100, OPPTS 870.2500, and OPPTS 870.240, respectively. Results were as follows:

Oral LD50 in Rats: >5000 mg/kg (considered non-toxic under the protocol); Primary Dermal Irritation in Rabbits: Not a skin irritant; Acute Eye Irritation in Rabbits: Minor eye irritant.

Example 2

Laboratory studies were conducted by growing cultures of Desulfovibrio vulgaris, available from NCIMB Ltd, Aberdeen, Scotland, UK as NCIMB 8303 (see Postgate, J. R., The Sulfate-Reducing Bacteria, 2nd Ed., Cambridge University Press, Cambridge; 1984) in 100 mL aliquots of mCSB containing 12 mM sodium sulfate, 30 mM sodium lactate and 10 mM sodium nitrate in one-liter serum bottles sealed with butyl rubber stoppers, which were flushed with nitrogen and autoclaved at about 120° C. prior to use. A 2% inoculum of freshly prepared D. vulgaris culture was added to the medium in each bottle and incubated at about 30° C. Each culture was grown to mid-log phase to achieve a sulfide concentration of about 12.2±1.4 mM before adding about 25 mL of an aqueous 100 ppm solution of the enzymic composition of Example 1 to each culture. Each culture was then sparged with 99.99% pure nitrogen gas and the pH was adjusted to 6.4 using a dilute solution of nitric acid. The sulfide concentration in the nitrogen stream from each culture bottle was monitored as a function of time.

The sulfide concentration in the nitrogen stream from each cultures was reduced to about 3.7±0.7 mM within about 20 minutes after addition of the enzymatic composition. After about six hours, the sulfide concentration was reduced below the detectable level (i.e., below about 0.1 ppm). Controls using about 10 mM sodium nitrate showed a decrease in sulfide production after about 9 hours, but the extent of the decrease was typically only about 10-15% of the decrease observed with the composition of Example 1.

Example 3

The enzymatically active composition of Example 1 was evaluated for effectiveness at controlling the odor of an industrial metal working fluid at a commercial metal working facility, which is generally operated at a pH of about 8.0. A freshly prepared metal working sump was used in the test, and was evaluated for the presence of SRB using a commercially available test kit (SANI-CHECK™ SRB) from BioSan Laboratories Inc. The test kit indicated that the level of sulfate reducer per mL of fluid was greater than or equal to 1000, which is in the low to moderate range for metal working fluids. The sump smelled of 'rotten eggs', which indicated the presence of hydrogen sulfide gas produced by SRB. After the addition of a single application of about 300 ppm of the composition of Example 1, the odor from the sump went away within about 24 hours and did not return during the three month test period. No SRB was detected in the fluid using the Sani-Check SRB test kit after one week, one month, and three months.

Example 4

A test was conducted to extend the bath life of an industrial cleaning bath at a major automotive manufacturing facility using the composition of Example 1. The useful life of a cleaning bath is critical to most manufacturers, for reasons of cost. A 12,000 gallon central cleaning system, operating at a slight alkaline pH of 7.2, uses 0.5 micron bag filters prior to ultrafiltration to extend the bath life by physically removing bacteria and biomass. The biomass in the tank (bath) was out of control in this facility and was clogging the ultrafiltration system daily. Typically, the ultrafilter required cleaning every 3 days due to clogging. The cleaning solution was visually dark and cloudy when sampled in a glass container. The bath used in the evaluation was going to be dumped, since the filtering was no longer effective. Typically, the plant would dump the bath, clean out the tank and refill with fresh cleaner. In this instance, instead of dumping the bath, the composition of Example 1 was added to the system at a concentration of about 50 ppm, which rapidly brought the biomass problem under control. After the 0.5 micron filter bags had filled and were cleaned several times, the cleaning solution became visually clearer (not cloudy) and amber in color, and the biofilms on the sides of the tank had visibly disappeared. According to the operator, the treated bath looked like fresh new cleaning solution. After the treatment, the ultrafilter was operated for 22 days without clogging or cleaning, versus the typical 3-day period that was the norm prior to the treatment. The system operated at peak efficiency after the addition of the composition of the invention for the 2 month duration of the test and no hydrogen sulfide gas was detected during that period.

Example 5

Figure 2:
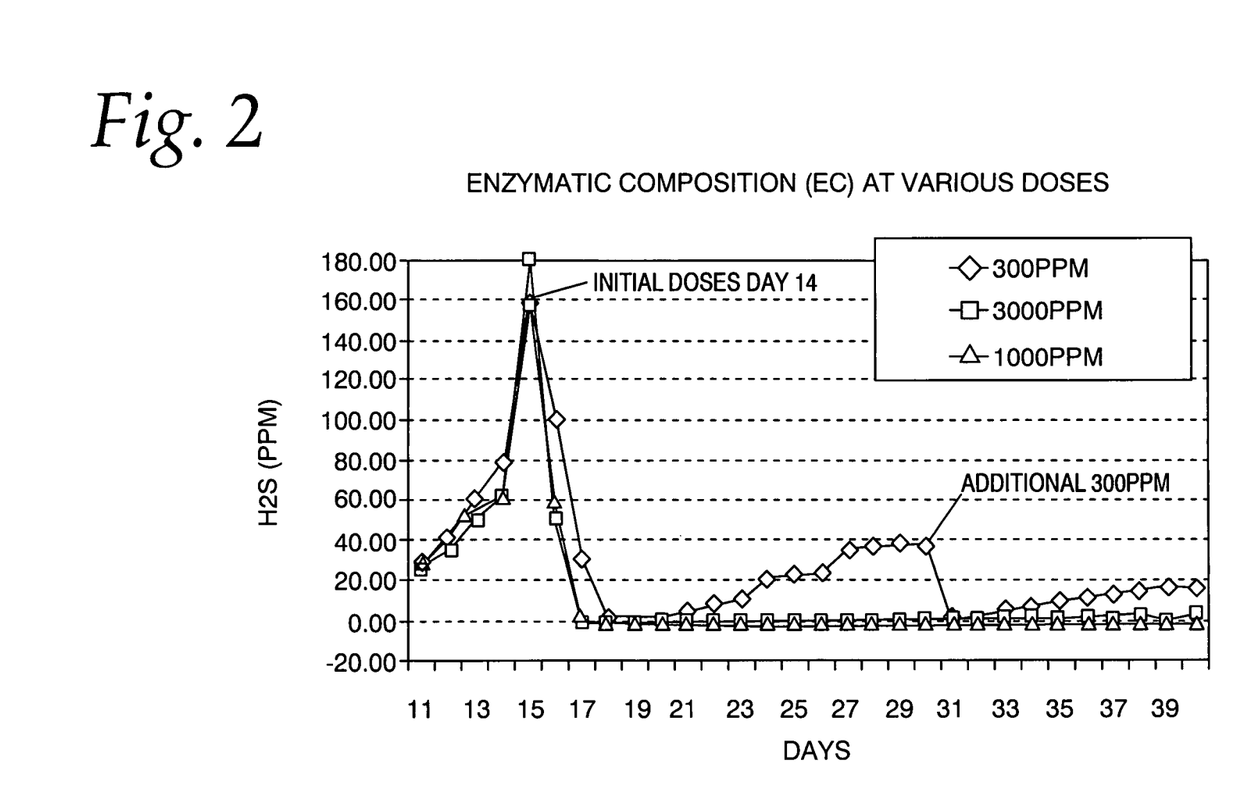
FIG. 2 shows a graph of hydrogen sulfide concentration (in ppm) versus time (in days) generated from sulfide-containing water treated with the composition of Example 1 at various concentrations.

A test was conducted at bench scale using four sealed 5-gallon (about 19 liter) containers. Each 5-gallon container was filled with about 20 pounds (about 9.1 Kg) of waste drywall (calcium sulfate) along with a nutrient source comprising about 4 teaspoons of sugar (about 16 grams), about 2 gallons (about 7.7 liters) of leachate from a landfill (containing SRB) that had hydrogen sulfide odor issues, and about 1.5 gallons (about 5.8 liters) of water. The leachate resulted in strong active SRB colonies within the containers. Nitrogen gas was continually passed through the containers to eliminate any oxygen that could suppress hydrogen sulfide production and to provide a gas flow in which hydrogen sulfide produced in the containers could be measured. The operating pH was about 5.2. Various levels of the composition of Example 1 were then added to selected containers and the hydrogen sulfide levels were monitored in the nitrogen stream from each of the containers over time (Table 5). As shown in Table 5, a 100 ppm level of the composition of Example 1 controlled SRB growth and lowered hydrogen sulfide production for one day; a 300 ppm level controlled SRB growth and lowered hydrogen sulfide production for 2 to 6 days, while a 3000 ppm level completely stopped all SRB activity, as measured by hydrogen sulfide production, for greater than 90 days (see FIG. 2). As a comparison, Trosan BK-86 biocide was added to one container with similar results—all SRB activity, as measured by hydrogen sulfide level, was controlled for greater than 30 days at 3000 ppm and greater than 90 days at 10,000 ppm.

TABLE 5

Effect of Various Levels of the Composition of Example 1 on Hydrogen Sulfide Generation in Anaerobic Reactors

| Level of Enzymatic Composition (ppm) | $H_2S$ Control Period (days) |
| --- | --- |
| 100 | <1 |
| 300 | 2-6 |
| 3000 | >30 |
| 10000 | >90 |

Example 6

A large electrical power plant had a sludge thickening system containing calcium sulfite/sulfate sludge obtained from flue-gas desulfurization, and which had problems with biological growth. A polymer sold under the trade name CHEMTREAT® 814 (from ChemTreat, Inc. of Glen Allen, Va.) had been added to settle the sludge in the sludge thickener tank. For the last six months the plant had experienced uncontrollable SRB growth. The contents (3.2 million gallon) of the thickener tank were completely black due to metal sulfite formation from SRB growth, even after the addition of one to two tank cars of sodium bromide and sodium hypochlorite (bleach). At one point several drums of biocide were also added, which did not solve the problem. Within a few weeks after addition of the biocide the SRB came back and the contents of the thickener tank once again turned black.

In order to simulate tank conditions, portions of the various inputs to the contaminated sludge thickener (influent and polymer) were mixed with a small amount of a sample from the contaminated thickener to provide a seed solution for the SRB growth. The seed solution consisted of about one liter of influent, about 20 mL of polymer, and about 20 mL of contaminated thickener tank contents. The mixed seed solution was shaken, and aliquots (about 15 mL each) were transferred to seven clear test tubes. Two of the aliquots were used as controls. The remaining tubes were treated with the composition of Example 1 at levels ranging from about 16 ppm to about 600 ppm. The tubes were then sealed. All samples were maintained at ambient room temperature (about 21° C.) and at neutral pH. The control samples turned black from SRB growth after 3 weeks, while the samples treated with the composition of the invention did not turn black at all over the 120-day period of the test, indicating that SRB growth was effectively arrested by the composition of Example 1.

Example 7

A comparison of sodium hypochlorite (bleach) and the composition of Example 1 was conducted to evaluate the relative effectiveness of the compositions of the invention for amelioration of sulfide contamination. Three continuously stirred tank reactors, each having a liquid volume of about 300 mL in a 500 mL total volume, were normally operated at a pH of about 7.5 with about 200 ppm of sodium sulfate and about 800 ppm of sodium acetate in the aqueous contents of the reactors. Nitrogen (99.99% pure) was bubbled through each reactor to remove any generated hydrogen sulfide gas for measurement.

One of the reactors was used as a control, another was treated with about 200 ppm of hypochlorite bleach on Day 3, and the third reactor was treated with about 100 ppm of the composition of Example 1, also on Day 3. All reactors were adjusted to an operating pH of about 5.2 by the addition on Day 3 of sulfuric acid to the control reactors and to the third reactor inasmuch as the addition of hypochlorite bleach lowered the pH to about 5.2 in the reactor receiving same.

Figure 3:
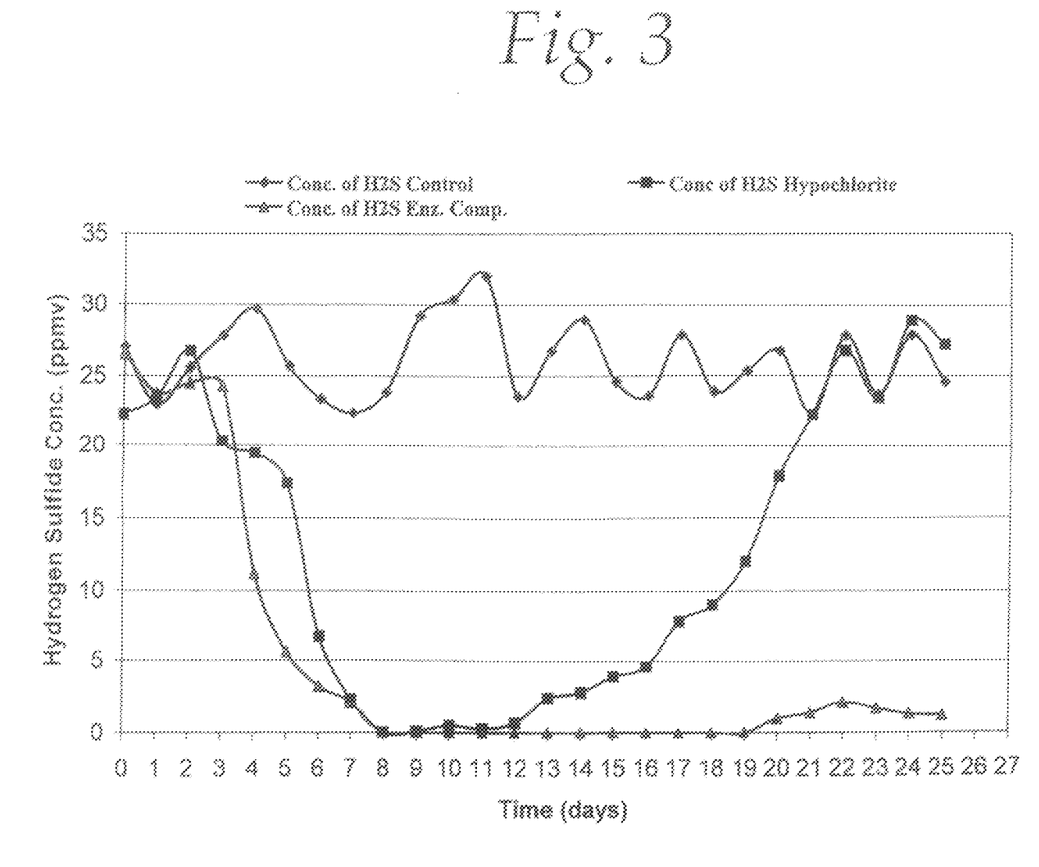
FIG. 3 shows a graph of hydrogen sulfide concentration (in ppm) versus time (in days) generated from sulfide-containing water treated with hypochlorite compared to water treated with the composition of Example 1, and a control with no treatment.

The concentration of hydrogen sulfide being swept out of each reactor in the nitrogen stream was monitored using an online sensor. FIG. 3 shows the hydrogen sulfide concentration of the nitrogen stream from each reactor as a function of time. As shown in FIG. 3, the composition of Example 1 inhibited the production of hydrogen sulfide significantly better than hypochlorite. During a 25 day period, the composition of the invention at a pH of 5.2 was 60% more effective than hypochlorite at controlling sulfide production.

Example 8

Figure 4:
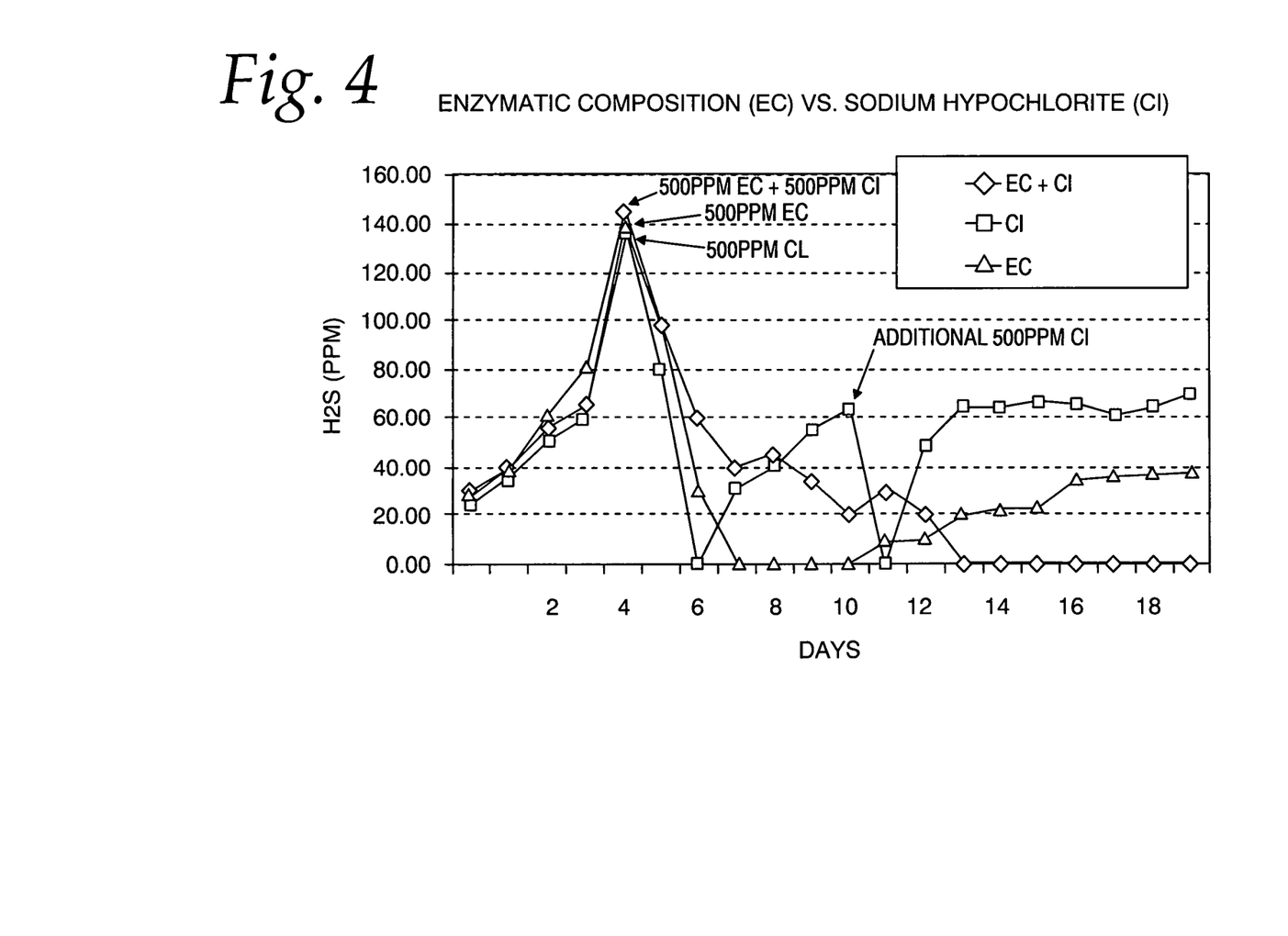
FIG. 4 shows a graph of hydrogen sulfide concentration (in ppm) versus time (in days) generated from sulfide-containing water treated with hypochlorite compared to water treated with the composition of Example 1 in combination with hypochlorite.

A leachate from a sugar beet pond contaminated with SRB was fed into three 5-gallon containers filled with a nutrient source, sulfate and water. The contents in each container consisted of about 500 mL of SRB-contaminated sugar beet pond water, about 3.84 liters of vinegar (about 5% acetic acid content) about 450 mL of 0.5 N sulfuric acid, about 150 g of sodium hydroxide to adjust the pH to about 6.8, the normal pH and enough additional water to achieve a total volume of about 5 gallons. Nitrogen gas was continuously passed through the each container to eliminate any oxygen and to provide a gas flow in which to measure hydrogen sulfide generated in each container. About 500 ppm of a 10% solution of sodium hypochlorite was added to one of the reactors. An identical amount hypochlorite was added to another reactor, along with about 500 ppm of the composition of Example 1. About 500 ppm of the composition of Example 1 was added to the third container (without hypochlorite). The hydrogen sulfide level in the nitrogen gas stream from each container was monitored over time. The results are presented in FIG. 4. The container treated only with the composition of the invention went to zero hydrogen sulfide production over about seven days, and stayed at zero for about four days thereafter. The container treated with bleach alone went to zero within six days and remained at zero for less than one day. Addition of another identical dose of hypochlorite to this container only suppressed hydrogen sulfide production for less than one additional day. The hydrogen sulfide concentration from the container treated with both hypochlorite and the composition of Example 1 fell to zero over about 13 days and remained at zero for greater than eight days. From the data in FIG. 4, it is clear that the enzymatically active compositions of the invention can work cooperatively with inexpensive biocidal compositions such as hypochlorite to effectively extend the useful lifetime of inexpensive biocides such as hypochlorite.

Example 9

A used metalworking fluid from a Midwest automotive plant and a soluble oil having a high sulfate content were used to prepare synthetic effluent by combining about 200 ml of the oil with about four gallons (about 15 L) of water and one gallon (about 3.84 L) of the contaminated metal working fluid. The mixture was allowed to stand for about ten days and smelled of hydrogen sulfide by the end of this period. The mixture was then stirred and 15 samples (about 500 mL each) were removed and placed in separate containers. The containers were allowed to stand, open to the air, for about 4 additional days, after which time the aerobic bacterial count in each of the sample was measured using Biosan BF test strips. All of the samples contained >10⁷ bacteria/mL and smelled of hydrogen sulfide, indicating the presence of anaerobic bacteria, as well. The 15 samples, at neutral pH, were then individually treated with different biocides and combinations of biocides with the enzymatic composition of Example 1. The bacterial and yeast/mold counts in each sample were monitored over about 14 days. The treatments and measured bacterial and yeast/mold counts are provided in Tables 6, 7 and 8. The results in Tables 7 and 8 indicate that the compositions of the present invention significantly improved the biocidal efficiency of a wide variety of biocides against both bacteria, as well as yeast and mold.

TABLE 6

Treatments.

| Sample | Treatment |
|---|---|
| 1 | 500 ppm Enzymatic Composition of Ex. 1 (EC) |
| 2 | 500 ppm EC |
| 3 | 250 ppm HHET |
| 4 | 250 ppm HHET |
| 5 | 250 ppm HHET + 500 ppm EC |
| 6 | 250 ppm HHET + 500 ppm EC |
| 7 | 50 ppm IPBC |
| 8 | 50 ppm IPBC |
| 9 | 50 ppm IPBC + 500 ppm EC |
| 10 | 15 ppm KATHON |
| 11 | 15 ppm KATHON |
| 12 | 15 ppm KATHON + 500 ppm EC |
| 13 | 500 ppm THPS |
| 14 | 500 ppm THPS |
| 15 | 500 ppm THPS + 500 ppm EC |

TABLE 7

Bacterial Counts.

| Sample | Day 0 | Day 1 | Day 3 | Day 4 | Day 6 | Day 8 | Day 10 | Day 12 | Day 14 |
|---|---|---|---|---|---|---|---|---|---|
| 1 | >$10^7$ | >$10^7$ | >$10^7$ | >$10^7$ | >$10^7$ | >$10^7$ | >$10^7$ | >$10^7$ | >$10^7$ |
| 2 | >$10^7$ | >$10^7$ | >$10^7$ | >$10^7$ | >$10^7$ | >$10^7$ | >$10^7$ | >$10^7$ | >$10^7$ |
| 3 | >$10^7$ | <100 | <100 | 100 | 1000 | $10^4$ | >$10^7$ | $10^6$ | >$10^7$ |
| 4 | >$10^7$ | <100 | 100 | 100 | 1000 | $10^5$ | >$10^7$ | >$10^7$ | >$10^7$ |
| 5 | >$10^7$ | <100 | <100 | <100 | 100 | 100 | 1000 | 1000 | $10^4$ |
| 6 | >$10^7$ | <100 | <100 | 100 | 100 | 1000 | 1000 | $10^4$ | $10^6$ |
| 7 | >$10^7$ | <100 | <100 | 100 | 100 | 100 | 1000 | $10^4$ | $10^5$ |
| 8 | >$10^7$ | <100 | <100 | 100 | 100 | 100 | $10^4$ | $10^5$ | >$10^7$ |
| 9 | >$10^7$ | <100 | <100 | 100 | 100 | 100 | 1000 | 1000 | $10^4$ |
| 10 | >$10^7$ | <100 | <100 | 100 | 1000 | $10^5$ | $10^6$ | >$10^7$ | >$10^7$ |
| 11 | >$10^7$ | <100 | <100 | <100 | 100 | 100 | 1000 | $10^4$ | $10^4$ |
| 12 | >$10^7$ | <100 | <100 | <100 | 1000 | 1000 | 1000 | $10^4$ | $10^4$ |
| 13 | >$10^7$ | <100 | <100 | 100 | 1000 | 1000 | >$10^5$ | $10^6$ | >$10^7$ |

TABLE 7-continued

Bacterial Counts.

| Sample | Day 0 | Day 1 | Day 3 | Day 4 | Day 6 | Day 8 | Day 10 | Day 12 | Day 14 |
|---|---|---|---|---|---|---|---|---|---|
| 14 | >$10^7$ | <100 | 100 | 100 | 1000 | $10^5$ | >$10^7$ | >$10^7$ | >$10^7$ |
| 15 | >$10^7$ | <100 | 100 | <100 | 100 | 100 | 1000 | 1000 | $10^4$ |

TABLE 8

Mold and Yeast Counts.

| Sample | Day 0 | Day 1 | Day 3 | Day 4 | Day 6 | Day 8 | Day 10 | Day 12 | Day 14 |
|---|---|---|---|---|---|---|---|---|---|
| 1 | $10^4$ | $10^4$ | $10^4$ | $10^3$ | $10^3$ | $10^3$ | $10^3$ | $10^4$ | $10^3$ |
| 2 | $10^4$ | $10^4$ | $10^4$ | $10^4$ | $10^4$ | $10^3$ | $10^3$ | $10^3$ | $10^3$ |
| 3 | $10^4$ | 0 | 0 | 0 | 10 | 10 | $10^3$ | $10^4$ | $10^3$ |
| 4 | $10^3$ | 0 | 0 | 0 | 0 | 100 | 10 | 100 | 100 |
| 5 | $10^4$ | 0 | 0 | 0 | 0 | 0 | 0 | 0 | 0 |
| 6 | $10^4$ | 0 | 0 | 0 | 0 | 0 | 0 | 0 | 0 |
| 7 | $10^3$ | 0 | 0 | 0 | 0 | 100 | 10 | 100 | $10^3$ |
| 8 | $10^4$ | 0 | 0 | 0 | 100 | $10^3$ | $10^3$ | $10^3$ | $10^3$ |
| 9 | $10^4$ | 0 | 0 | 0 | 0 | 0 | 0 | 0 | 0 |
| 10 | $10^4$ | 0 | 0 | 10 | 10 | 10 | $10^3$ | $10^4$ | $10^4$ |
| 11 | $10^4$ | 0 | 0 | 0 | 0 | 0 | 0 | 0 | 0 |
| 12 | $10^3$ | 0 | 0 | 0 | 0 | 0 | 0 | 0 | 0 |
| 13 | $10^3$ | 0 | 0 | 0 | 0 | 100 | 10 | 100 | $10^3$ |
| 14 | $10^4$ | 0 | 0 | 0 | 100 | $10^3$ | $10^3$ | $10^3$ | $10^3$ |
| 15 | $10^4$ | 0 | 0 | 0 | 0 | 0 | 0 | 0 | 0 |

In Table 6, THPS refers to tetrakis(hydroxymethyl)phosphonium sulfate; HHET refers to hexahydro-1,3,5-tris(2-hydroxyethyl)-s-triazine; IPBC refers to 3-iodo-2-propynyl butyl carbamate; and KATHON refers to a biocidal mixture of 5-chloro-2-methyl-3(2H)-isothiazolone with 2-methyl-3(2H)-isothiazolone, sold under the trade name KATHON® 886MW by Rohm and Haas, Philadelphia, Pa.

The foregoing discussion and the examples are intended as illustrative of the present invention and are not to be taken as limiting. Still other variations within the spirit and scope of the present invention are possible and will readily present themselves to those skilled in the art.

We claim:

1. An enzymatically active composition for suppressing sulfide generation and biofilm formation which comprises:
   an enzyme composition obtained by a process comprising removing water from a culture medium of a nitrate-reducing, sulfide-oxidizing (NR-SOB) mixed bacterial culture deposited under accession No. PTA-8448, said enzyme having sufficient sulfide-production inhibiting activity in an acidic medium; and
   an oxidized nitrogenous inorganic salt present in an amount sufficient to act as an electron acceptor for the enzyme;
   said enzymatically active composition being free from sulfur dehydrogenase, free from viable bacteria, and having an oral $LD_{50}$ in rats greater than 1000 mg/Kg of body weight at a concentration of about 25,000 parts per million (ppm) in water.

2. The enzymatically active composition of claim 1 wherein the oxidized nitrogenous inorganic salt is selected from the group consisting of an alkali metal nitrite, an alkaline earth metal nitrite, an alkali metal nitrate, an alkaline earth metal nitrate, and a mixture of two or more of the foregoing salts.

3. The enzymatically active composition of claim 1, which further comprises a microbial growth inhibitor.

4. The enzymatically active composition of claim 3 wherein the microbial growth inhibitor is selected from the group consisting of a quaternary ammonium cationic surfactant, an aldehyde, an alkali metal molybdate, an alkaline earth metal molybdate, a nitrite salt, and a mixture of two or more of the foregoing inhibitors.

5. The enzymatically active composition of claim 3 wherein the microbial growth inhibitor comprises a nitrite salt.

6. The enzymatically active composition of claim 1 wherein the composition further comprises an enzyme having nitrate reducing activity, nitrite reducing activity, or a combination thereof.

7. The enzymatically active composition of claim 1 wherein the oxidized nitrogenous inorganic salt is present in the composition in an amount in the range of about 0.1 to about 45 percent by weight.

8. The enzymatically active composition of claim 1 in free flowing powder form.

9. The enzymatically active composition of claim 1 in an aqueous solution.

10. The enzymatically active composition of claim 1 prepared by a process comprising the steps of:
   (a) growing a nitrate-reducing sulfide oxidizing (NR-SOB) mixed bacterial culture, deposited under accession No. PTA-8448, in an aqueous nutrient culture medium containing a sulfate salt, an organic salt, and a nitrate salt;
   (b) subsequently adding a bacterial growth inhibitor to the culture medium in an amount sufficient to substantially arrest bacterial growth therein; and
   (c) removing a sufficient amount of water from the resulting growth medium to obtain an enzymatically active solid composition therefrom.

11. The enzymatically active composition of claim 10 wherein the organic salt comprises a lactate salt.

12. The enzymatically active composition of claim 10 wherein the aqueous nutrient medium comprises about 12 mM sodium sulfate, about 30 mM sodium lactate, and about 10 mM sodium nitrate.

13. The enzymatically active composition of claim 10 wherein the water is removed by evaporation to form a solid composition therefrom.

14. The enzymatically active composition of claim 10 wherein the water is removed by reverse osmosis to concentrate the mixture, and subsequently drying the concentrated mixture to form a solid composition therefrom.

* * * * *

UNITED STATES PATENT AND TRADEMARK OFFICE
CERTIFICATE OF CORRECTION

PATENT NO. : 8,535,661 B2  Page 1 of 1
APPLICATION NO. : 12/657210
DATED : September 17, 2013
INVENTOR(S) : Rakesh Govind et al.

It is certified that error appears in the above-identified patent and that said Letters Patent is hereby corrected as shown below:

In the Specification

Column 14,
Line 18, ">10' bacteria/mL" should be -- $>10^7$ bacteria/mL --.

Signed and Sealed this
First Day of April, 2014

Michelle K. Lee
*Deputy Director of the United States Patent and Trademark Office*